(12) United States Patent
Stahl

(10) Patent No.: US 7,871,118 B2
(45) Date of Patent: Jan. 18, 2011

(54) TIE-UP POINT FOR A LID DRIVE IN A MOTOR VEHICLE

(75) Inventor: Rainer Stahl, Sersheim (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 65 days.

(21) Appl. No.: 12/435,431

(22) Filed: May 5, 2009

(65) Prior Publication Data

US 2009/0294196 A1 Dec. 3, 2009

(30) Foreign Application Priority Data

May 27, 2008 (DE) .................. 10 2008 026 502

(51) Int. Cl.
*B60J 5/10* (2006.01)
(52) U.S. Cl. ................. 296/146.4; 296/76; 296/193.11; 49/340; 180/69.2
(58) Field of Classification Search ............. 296/146.4, 296/146.8, 193.11, 76, 56, 106; 49/340, 49/339, 324; 180/69.2, 69.21
See application file for complete search history.

(56) References Cited

U.S. PATENT DOCUMENTS

| 3,519,300 | A | 7/1970 | McKey |
| 4,955,659 | A | 9/1990 | Kosugi |
| 4,973,103 | A | 11/1990 | Imajyo et al. |
| 6,007,133 | A | 12/1999 | Heim et al. |
| 6,364,405 | B1 | 4/2002 | Kim |
| 6,901,704 | B2 * | 6/2005 | Sakaue et al. .................. 49/340 |
| 7,566,087 | B2 * | 7/2009 | Hanna et al. ................... 296/76 |
| 7,690,715 | B2 * | 4/2010 | Hakamata et al. ............ 296/106 |
| 2010/0066120 | A1 * | 3/2010 | Etou et al. ................ 296/146.4 |

FOREIGN PATENT DOCUMENTS

| DE | 19809348 C1 | 8/1999 |
| DE | 10046117 C2 | 6/2003 |
| DE | 10231821 A1 | 2/2004 |
| DE | 19860556 B4 | 1/2006 |

* cited by examiner

*Primary Examiner*—Joseph D Pape

(57) ABSTRACT

A body-side tie-up point for a drive of a lid for a body aperture of a vehicle. The tie-up point has an inner reinforcing plate which is fastened on the outside to a sealing duct laterally adjacent to the body aperture, and an outer reinforcing plate which is fastened to the inner reinforcing plate on a side facing away from the sealing duct. A strengthening element is provided which bears against the sealing duct and the inner reinforcing plate in a contact zone on a side facing away from the inner reinforcing plate. The outer reinforcing plate directly or indirectly supports the strengthening element in a region spaced apart from the contact zone.

19 Claims, 1 Drawing Sheet

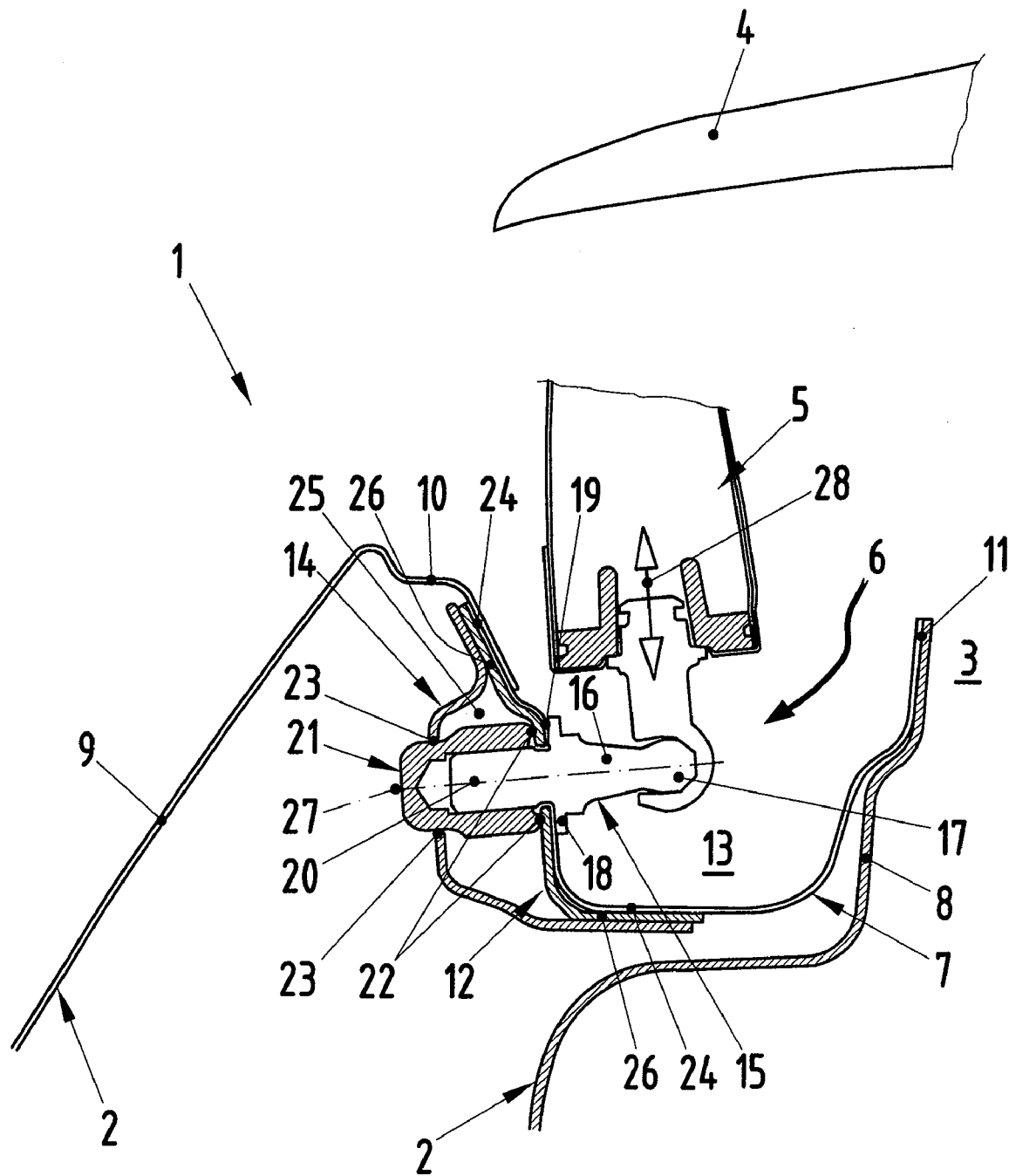

TIE-UP POINT FOR A LID DRIVE IN A MOTOR VEHICLE

CROSS-REFERENCE TO RELATED APPLICATION

This application claims the priority, under 35 U.S.C. §119, of German application DE 10 2008 026 502.0, filed May 27, 2008; the prior application is herewith incorporated by reference in its entirety.

BACKGROUND OF THE INVENTION

Field of the Invention

The present invention relates to a body-side tie-up point for a drive of a lid for a body aperture of a vehicle. The invention relates, moreover, to a vehicle equipped with at least one such tie-up point.

A vehicle body may have, for example for an engine space and for a luggage space, corresponding body apertures which can be closed with the aid of a suitable hood-shaped or flap-shaped lid. To increase comfort, the respective lid may be assigned a lid drive which makes it easier to open the respective lid and which, moreover, makes it possible to hold the respective lid in the open position. Since a lid may be comparatively heavy, a body-side tie-up point, via which the drive is supported on the vehicle body, must have corresponding rigidity and stability.

German patent DE 198 60 556 B4 discloses a vehicle having a tailgate which is pivotable about a vertical pivot axis. For this purpose, corresponding pivot hinges are fastened to a stiffened corner region of the vehicle body. For stiffening, the vehicle body is configured in this corner region as a column which contains inside it a plurality of stiffening plates.

A further column-like body structure which is reinforced with the aid of stiffening plates may be gathered from German patent DE 100 46 117 C2, corresponding to U.S. Pat. No. 6,364,405.

Published, non-prosecuted German patent DE 102 31 821 A1 shows a vehicle body with a rear body aperture.

A further vehicle body with a rear aperture is known from German patent DE 198 09 348 C1, corresponding to U.S. Pat. No. 6,007,133. This shows, for closing the body aperture, a flap-shaped lid which is prestressed into its open position with the aid of a pneumatic lid drive. The lid drive is in this case supported, on the body side, in the region of a frame bordering the body aperture.

SUMMARY OF THE INVENTION

It is accordingly an object of the invention to provide a tie-up point for a lid drive in a motor vehicle that overcomes the above-mentioned disadvantages of the prior art devices of this general type. The present invention is concerned with the problem of showing a way for supporting a drive for a lid for closing a body aperture of a vehicle on the vehicle body which is distinguished, in particular, in that relatively high forces can be transmitted between the drive and the body, while at the same time a relatively high fatigue strength is to be capable of being implemented.

With the foregoing and other objects in view there is provided, in accordance with the invention, a body-side tie-up point for a drive of a lid for a body aperture of a vehicle. The body-side tie-up point contains a sealing duct disposed laterally adjacent to the body aperture; an inner reinforcing plate fastened on an outside to the sealing duct; an outer reinforcing plate fastened to the inner reinforcing plate on a side facing away from the sealing duct; and a strengthening element penetrating through the sealing duct and the inner reinforcing plate and bears at a contact zone against a side of the sealing plate which faces away from the inner reinforcing plate; The outer reinforcing plate directly or indirectly supports the strengthening element in a region spaced apart from the contact zone.

The invention is based on the general idea of stiffening a region of a sealing duct, in which the lid drive is to be supported on the body side. With the aid of an inner reinforcing plate and of an outer reinforcing plate, a strengthening element intended to be coupled to the drive is supported on two regions which are spaced apart from one another in a longitudinal direction of the strengthening element which extends transversely with respect to the force transmission direction between the drive and the strengthening element. The spaced-apart support of the strengthening element can thus readily absorb torques which are introduced into the strengthening element as a result of a lateral support of the drive on the strengthening element. The tie-up point thus formed can thereby absorb comparatively high forces. It can therefore be exposed to correspondingly high loads and correspondingly possesses high durability.

This is implemented in the tie-up point according to the invention, on the one hand, in that the strengthening element is supported on the sealing duct in a contact zone and, on the other hand, in that the strengthening element is directly or indirectly supported, spaced apart from this contact zone, on the outer reinforcing plate.

According to an advantageous embodiment, moreover, the tie-up point may have a bush, into which the strengthening element is inserted and which is fastened both to the inner and to the outer reinforcing plate. With the aid of the bush, a receptacle which possesses comparatively high strength can be provided for the strengthening element. The entire tie-up point is intensively stiffened with the aid of the bush. Furthermore, the bush can be effectively supported within the tie-up point via the reinforcing plates. Moreover, the bush simplifies the mounting of the strengthening element.

An embodiment is particularly advantageous in which the outer reinforcing plate is supported on the inner reinforcing plate in a peripherally closed manner with respect to the strengthening element. This affords a highly stable pot-shaped or dome-shaped configuration for the outer reinforcing plate which ensures that the tie-up point has high stability. The connection between the inner and the outer reinforcing plate may likewise be configured in a peripherally closed manner. Alternatively, an embodiment is also possible in which a plurality of singular fastening points arranged so as to be distributed in the circumferential direction of the strengthening element are provided between the inner and the outer reinforcing plate.

In another advantageous embodiment, a side, facing the sealing duct, of the inner reinforcing plate may be shaped complementarily to a side, facing the inner reinforcing plate, of the sealing duct. As a result of this directed shaping of the inner reinforcing plate, large-area contacting between the inner reinforcing plate and the sealing duct can be implemented. In conjunction with a corresponding connection between the inner reinforcing plate and the sealing duct, an intensive stiffening of the sealing duct in the region of the tie-up point, for example in the manner of a doubling of material, can be implemented here. For this purpose, for example, a connection, peripherally closed with respect to the strengthening element, between the inner reinforcing plate and the sealing duct may be provided; fastening by a plurality of singular fastening points arranged so as to be distributed in the circumferential direction of the strengthening element may likewise be envisaged.

It will be appreciated that the features mentioned above and those yet to be explained below can be used not only in the combination specified in each case, but also in other combinations or alone, without departing from the scope of the present invention.

Other features which are considered as characteristic for the invention are set forth in the appended claims.

Although the invention is illustrated and described herein as embodied in a tie-up point for a lid drive in a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a diagrammatic, sectional view of a vehicle body in a region of a sealing duct according to the invention.

DETAILED DESCRIPTION OF THE INVENTION

Referring now to the single FIGURE of the drawing in detail, there is shown a motor vehicle 1, illustrated only partially, which is preferably a passenger car, and has a body 2, only partially illustrated. The body 2 may have a body aperture 3 which can be closed by a lid 4. The body aperture 3 is, for example, an engine space aperture or a luggage space aperture which may be arranged on the body 2 at the rear or at the front. The lid 4, for example in the form of a hood or in the form of a flap, correspondingly forms a closure for the body aperture 3.

So that the lid 4 can be held in its open position and/or so that the opening movement of the lid 4 can be assisted, at least one drive 5 is provided. The drive 5 may operate pneumatically and be configured, for example, as a pneumatic pressure cylinder. An electromotive drive 5 may basically likewise also be envisaged. A hydraulic drive 5 also should not be ruled out. The drive 5 is articulated on the lid side on the lid 4 at a suitable point, not illustrated here. On the body side, the drive 5 is connected to the body 2 via a tie-up point 6.

The tie-up point 6 is in this case arranged or formed in a sealing duct 7. The sealing duct 7 is laterally adjacent to the body aperture 3. In the example, the sealing duct 7 is fastened, on an outside facing away from the body aperture 3, to an inner panel 8 of the body 2, the inner panel delimiting the body aperture 3 laterally. Furthermore, here, the sealing duct 7 is fastened to an outer panel 9 of the body 2. In this case, here, the sealing duct 7 is arranged in an angled marginal region 10 of the outer panel 9 in such a way that the sealing duct 7 bears against the outer panel 9 on a side of the latter which faces away from the body aperture 3. The sealing duct 7 serves, on the one hand, for receiving the drive 5 when the lid 4 assumes its closing position and closes the body aperture 3. With the lid 4 closed, the drive 5 extends within the sealing duct 7. On the other hand, the sealing duct 7 serves for receiving a non-illustrated seal. The seal seals the sealing duct 7 with respect to the lid 4 adjusted into the closing position.

The seal may be fastened to the lid 4. An embodiment in which the seal is fastened to the sealing duct 7 may basically also be envisaged. For example, the seal may be fastened to a margin 11 which delimits the body aperture 3 laterally and which is formed on the inside by the inner panel 8 and on the outside by the sealing duct 7.

The tie-up point 6 has an inner reinforcing plate 12 which is fastened to the sealing duct 7 on the outside with respect to a duct space 13 bordered by the sealing duct 7. In the example shown, the inner reinforcing plate 12 possesses the same contouring as the sealing duct 7 in the region of the tie-up point 6. In other words, an inside, facing the sealing duct 7, of the inner reinforcing plate 12 is shaped complementarily to an outside, facing the inner reinforcing plate 12, of the sealing duct 7. As a result, the inner reinforcing plate 12 can come to bear over a large area against the sealing duct 7 on the outside. Consequently, in particular, an intensive stiffening of the sealing duct 7 in the region of the tie-up point 6 can be implemented.

Moreover, the tie-up point 6 is equipped with an outer reinforcing plate 14. This is fastened to the inner reinforcing plate 12 on an outside of the latter which faces away from the sealing duct 7. Furthermore, the tie-up point 6 contains a strengthening element 15. The strengthening element 15 is configured to be coupled to the drive 5. For this purpose, it has a tenon portion 16 which may be configured as a spherical tenon. A ball joint 17 is formed correspondingly between the drive 5 and the strengthening element 15. The strengthening element 15 penetrates through the wall of the sealing duct 7 and, moreover, penetrates through the inner reinforcing plate 12. The strengthening element 15 bears against the sealing duct 7 in an annular contact zone 19 via an annularly peripheral radially projecting collar 18. Furthermore, the strengthening element 15 is directly or indirectly supported on the outer reinforcing plate 14 in a region 20 spaced apart from the contact zone 19. An indirect support of the region 20 on the outer reinforcing plate 14 is shown here. For this purpose, the tie-up point 6 is equipped, moreover, with a bush 21. The strengthening element 15 is inserted with the region 20 into the latter. The bush 21 is then supported directly on the outer reinforcing plate 14. The strengthening element 15 is thus supported indirectly on the outer reinforcing plate 14 by the bush 21. The bush 21 is fastened, on the one hand, to the inner reinforcing plate 12 and, on the other hand, to the outer reinforcing plate 14.

The region 20 inserted through the sealing duct 7 and through the inner reinforcing plate 12 preferably forms a threaded portion which is likewise designated below by 20. The threaded portion 20 has an external thread, not designated in any more detail. The bush 21 is expediently configured as a threaded bush and correspondingly possesses an internal thread complementary to the external thread of the strengthening element 15. The strengthening element 15 is correspondingly screwed into the bush 21. By an appropriate tightening torque between the strengthening element 15 and bush 21, an axial pressing together of the sealing duct 7 and of the inner reinforcing plate 12 between the bush 21 and the collar 18 can be implemented, thus allowing an intensive support of the strengthening element 15 in the region of the contact zone 19.

In the embodiment shown, the bush 21 penetrates through the outer reinforcing plate 14. The latter thereby comes to bear on the outside against the bush 21 and therefore makes it possible to have, spaced apart from the contact zone 19, an intensive support of the bush 21. In the example, the bush 21 is configured to be closed on one side. It thereby possesses increased dimensional stability, this being advantageous for the rigidity of the tie-up point 6. The bush 21 may be welded to the inner reinforcing plate 12 at 22, in this case preferably by projection welding. Furthermore, the bush 21 may be welded to the outer reinforcing plate 14 at 23, preferably in this case by an MAG welding method.

The inner reinforcing plate 12 may be welded to the sealing duct 7 at 24. A spot-welding method is preferred in this case. In particular, a plurality of welding spots may be arranged so as to be distributed circumferentially with respect to the strengthening element 15. This affords intensive connection and stiffening between the inner reinforcing plate 12 and the sealing duct 7. For this purpose, the inner reinforcing plate 12 is expediently shaped such that it surrounds the strengthening element 15 on all sides. That is to say, the strengthening element 15 penetrates approximately centrally through the inner reinforcing plate 12. According to a preferred embodiment, the same may also be provided correspondingly for the outer reinforcing plate 14. The bush 21 expediently passes essentially centrally through the outer reinforcing plate 14. In other words, the outer reinforcing plate 14 surrounds the strengthening element 15 or the bush 21 essentially in a circumferentially closed manner. As a result of the clearance present in the region of the strengthening element 15 between the outer reinforcing plate 14 and the inner reinforcing plate 12, a cavity 25 is formed between the reinforcing plates 12, 14. This affords a dome-like or cupola-like structure which is distinguished by high strength. Expediently, the outer reinforcing plate 14 bears against the inner reinforcing plate 12 in a circumferentially closed manner with respect to the strengthening element 15 and, in particular, over a large area. According to an advantageous embodiment, the outer reinforcing plate 14 is welded, in particular spot-welded, to the inner reinforcing plate 12 at 26. Expediently, in this case, a plurality of welding spots are arranged so as to be distributed in the circumferential direction with respect to the strengthening element 15, in order to achieve intensive support and tie-up between the reinforcing plates 12, 14. In particular, as a result, on the one hand, a support between the reinforcing plates 12, 14 which extends peripherally with respect to the strengthening element 15 is achieved. On the other hand, the proposed welded joint allows fixing which is distributed in the circumferential direction with respect to the strengthening element 15. As a result, overall, an intensive stiffening of the tie-up point 6 can be implemented. The welded joints 24, 26 between the inner reinforcing plate 12 and the sealing duct 7, on the one hand, and between the outer reinforcing plate 14 and inner reinforcing plate 12, on the other hand, can be produced integrally, that is to say in common. For example, the two reinforcing plates 12, 14 can be spot-welded to the sealing duct 7 simultaneously, in such a way that the individual welding spots secure the outer reinforcing plate 14 to the inner reinforcing plate 12 and at the same time the inner reinforcing plate 12 to the sealing duct 7.

The high rigidity of the tie-up point 6 presented here is implemented, inter alia, by the support which is spaced apart with respect to a longitudinal mid-axis 27 of the strengthening element 15. In this case, the use of the bush 21 makes it possible to have an especially large clearance in this axial direction between the contact zone 19 and the support point between the bush 21 and the outer reinforcing plate 14. The longitudinal mid-axis 27 of the strengthening element 15 in this case stands essentially perpendicularly with respect to a main force transmission direction 28 in which force transmission between the drive 5 and the strengthening element 15 takes place.

The invention claimed is:

1. A body-side tie-up point for a drive of a lid for a body aperture of a vehicle, the body-side tie-up point comprising:
   a sealing duct disposed laterally adjacent to the body aperture;
   an inner reinforcing plate fastened on an outside of said sealing duct;
   an outer reinforcing plate fastened to said inner reinforcing plate on a side facing away from said sealing duct;
   a strengthening element penetrating through said sealing duct and said inner reinforcing plate and bearing at a contact zone against a side of said sealing duct which faces away from said inner reinforcing plate; and
   said outer reinforcing plate one of directly and indirectly supporting said strengthening element in a region spaced apart from said contact zone.

2. The tie-up point according to claim 1, further comprising a bush into which said strengthening element is inserted, said bush is fastened to said inner reinforcing plate and to said outer reinforcing plate.

3. The tie-up point according to claim 2, wherein said strengthening element has a threaded portion with an external thread, said bush has an internal thread complementary to said external thread, said strengthening element being screwed into said bush.

4. The tie-up point according to claim 2, wherein said bush penetrates through said outer reinforcing plate.

5. The tie-up point according to claim 2, wherein said bush is closed on one end.

6. The tie-up point according to claim 2, wherein said bush is welded to said inner reinforcing plate.

7. The tie-up point according to claim 2, wherein said bush is welded to said outer reinforcing plate.

8. The tie-up point according to claim 1, wherein said inner reinforcing plate is welded to said sealing duct.

9. The tie-up point according to claim 1, wherein said outer reinforcing plate is welded to said inner reinforcing plate.

10. The tie-up point according to claim 1, wherein said sealing duct is configured for receiving a seal which seals the lid with respect to said sealing duct in a closed position of the lid.

11. The tie-up point according to claim 1, wherein said sealing duct is configured for receiving the drive which extends within said sealing duct in a closed position of the lid.

12. The tie-up point according to claim 1, wherein said outer reinforcing plate is supported on said inner reinforcing plate peripherally with respect to said strengthening element.

13. The tie-up point according to claim 1, wherein said inner reinforcing plate is shaped, on a side facing said sealing duct, complementarily to a side of said sealing duct which faces said inner reinforcing plate, and bears against said sealing duct over a given area.

14. The tie-up point according to claim 6, wherein said bush is projection-welded to said inner reinforcing plate.

15. The tie-up point according to claim 7, wherein said bush is MAG-welded to said outer reinforcing plate.

16. The tie-up point according to claim 8, wherein said inner reinforcing plate is spot-welded to said sealing duct.

17. The tie-up point according to claim 9, wherein said outer reinforcing plate is spot-welded to said inner reinforcing plate.

18. A vehicle, comprising:
   a body having at least one body aperture formed therein;
   at least one lid for closing said body aperture;
   at least one drive for driving said lid;

a body-side tie-up point for supporting said drive on said body, said body-side tie-up point containing:
- a sealing duct disposed laterally adjacent of said body aperture;
- an inner reinforcing plate fastened on an outside to said sealing duct;
- an outer reinforcing plate fastened to said inner reinforcing plate on a side facing away from said sealing duct;
- a strengthening element penetrating through said sealing duct and said inner reinforcing plate and bearing at a contact zone against a side of said sealing duct which faces away from said inner reinforcing plate; and
- said outer reinforcing plate one of directly and indirectly supporting said strengthening element in a region spaced apart from said contact zone.

19. The vehicle according to claim 18, wherein the vehicle is a passenger car.

* * * * *